United States Patent Office
3,652,524
Patented Mar. 28, 1972

3,652,524
PROCESS FOR POLYMERIZING VINYL CHLORIDE WITH LOW MOLECULAR WEIGHT ACYL PEROXYCARBONIC ESTERS
Roger N. Lewis, Pinole, and Ronald L. Friedman, San Rafael, Calif., assignors to Argus Chemical Corp., Brooklyn, N.Y.
No Drawing. Original application Dec. 26, 1967, Ser. No. 693,187, now Patent No. 3,585,232, dated June 15, 1971. Divided and this application May 4, 1970, Ser. No. 46,587
Int. Cl. C08f 3/30, 1/11, 1/74
U.S. Cl. 260—92.8 W    7 Claims

ABSTRACT OF THE DISCLOSURE

Low molecular weight (4–7 carbon atoms) acyl peroxycarbonic aliphatic esters.

---

This is a division of application Ser. No. 693,187, filed Dec. 26, 1967, now Pat. No. 3,585,232.

This invention relates to organic peroxide compositions. More particularly, the invention relates to low molecular weight aliphatic acyl peroxycarbonic esters that are useful for initiating the polymerization of monomers such as vinyl chloride.

U.S. Pat. 3,108,093 describes the use of certain acyl peroxycarbonic esters for the initiation of polymerization reactions. The present invention is an improvement on those aspects of said patent by virtue of the discovery that low molecular weight acyl peroxycarbonic esters, i.e. those having from 4–7 carbon atoms, are superior polymerization initiators as compared with analogous but higher molecular weight esters such as those described in said patent.

It has been found that the new low molecular weight esters of this invention provides higher yields of polymer product under comparable conditions. At the same time the present materials perform their initiation function at a desirable rapid rate. While providing these advantages in utility, the present materials are quite stable, exhibiting longer half-lives than their higher molecular weight analogs. This stability is of significant commercial advantage in terms of shipping and storing of the compounds.

In general, the preferred group of compounds of this invention can be described as having the formula:

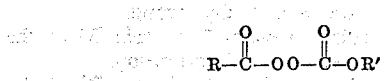

wherein R and R' are the same or different acyclic aliphatic groups, provided that the sum of the carbon atoms in R and R' is not more than 5.

Best results have thus far been observed where R in the above formula is a methyl group so that a preferred group of peroxides within the present invention may be referred to as acetyl peroxycarbonic esters.

In addition to alkyl groups, either straight or branched chain, derivatives within the invention broadly includes all of the aliphatic variations permissible within the molecular weight limitation imposed by the fact that R and R' collectively do not exceed 5 carbon atoms. Thus R and/or R' may contain diverse substituents such as the halogens as will be exemplified hereinafter, ether linkages, or hydroxyl groups. R and R' may also contain ethylenic or acetylenic unsaturation.

Typical compounds included are:

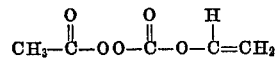

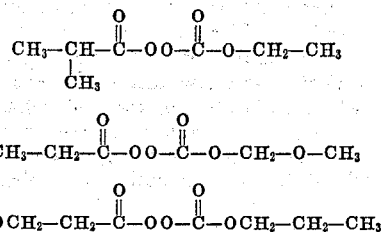

The new compounds of this invention may conveniently be made by the reaction of a peroxycarboxylic acid with a haloformate in accordance with the following general reaction. The basic catalyst may be sodium hydroxide, sodium carbonate, sodium bicarbonate, pyridine or trimethyl amine for examples.

The chloroformate is most generally selected for purposes of this reaction.

The compounds are principally contemplated for use in the production of polymers from monomers containing vinyl groups and which are capable of being polymerized in the usual fashion with a peroxide initiator. Typical monomers include ethylene, styrene, ethyl methacrylate, vinyl acetate, and the like. Exceptional results have been observed with the polymerization of vinyl chloride in the manufacture of polyvinyl chloride.

The following example illustrates the preparation of compounds within the scope of this invention.

EXAMPLE 1

Acetyl peroxyisobutyl carbonate

To 11.88 g. (0.0624 mole) of 40% peracetic acid and 25 ml. acetone is added over a five-minute period 9.39 g. (0.1187 mole) of pyridine at −12 to −6° C. to neutralize the acetic acid. Then 7.76 g. (0.0568 mole) of isobutyl chloroformate and 4.94 g. (0.0624 mole) pyridine are added simultaneously dropwise in 10–13 minutes at −10 to −2° C. The reaction mixture is well stirred during these additions. After the reaction mixture is stirred an additional two hours at −10 to −1° C., 25 ml. ether, a small amount of NaCl, and about 125 ml. ice water are added. After phase separation, the organic layer is washed once with 35 ml. ice water, twice with 35 ml. cold dilute H₂SO₄ (pH 1), once again with 35 ml. ice H₂O, twice with 40 ml. cold dilute KOH (<1%), and finally with two additional 35 ml. ice water washes. The organic layer is dried with anhydrous Na₂SO₄, filtered through anhydrous MgSO₄, and concentrated under vacuum using an ice water bath. Product A.O. (active oxygen) analysis: Theory, 9.08; Found, 8.52, 93.75% pure; 71.1% yield. A second synthesis gave a product of 95.83% purity and a yield of 76.7%.

Utilizing the above procedure except for the substitution of appropriate haloformates and peracids, the following materials were prepared in the purities and yields listed:

TABLE I

| Peroxide | Synthesis results | |
|---|---|---|
| | Percent purity | Percent yield |
| 1. Acetyl peroxy n-butyl carbonate | 74.67 in DMP* | 80.7 |
| 2. Acetyl peroxy ethyl carbonate | 55.14 in DMP* | 59.2 |
| 3. Acetyl peroxy 2-chloro ethyl carbonate | 51.48 in DMP* | 63.8 |
| 4. Acetyl peroxy isopropyl carbonate | 60.36 in DMP* | 41.4 |
| 5. Lauroyl peroxy isobutyl carbonate: | | |
| 1st run | 88.63 | 74.8 |
| 2nd run | 88.39 | 79.6 |

*DMP=Dimethyl phthalate.

To illustrate the superiority of the new compounds as vinyl polymerization initiators, a series of polymerizations of vinyl chloride were carried out with various initiators. The tests were conducted in a 6½ fluid oz. ordinary Coke bottle. 94.0 grams of frozen dispersing solution was added to each Coke bottle. The dispersing solution is a conventional media for conducting suspension polymerization of vinyl chloride and contains water and suspending agents. Each Coke bottle also received 0.00094 mole of peroxide catalyst or initiator and 50.0 grams of vinyl chloride monomer. Since the catalysts were added on a molar basis, differences in molecular weights are discounted and equivalent results should be obtained unless there is a difference in the inherent properties and efficiency of the catalysts.

After the contents were added to the Coke bottles, they were capped, the contents almost melted, and the bottles placed in a rotating constant temperature bath at 40° C. for 6 hours. The bottles were then cooled and excess monomer vented. The polyvinyl chloride product was filtered, washed and dried.

The following table shows the catalysts employed and the results in terms of weight yield and percent yield of polyvinyl chloride relative to the starting amount of vinyl chloride monomer:

TABLE II

| Peroxide | Utility as an initiator for vinyl chloride | |
|---|---|---|
| | Avg. PVC yield, g. | PVC yield, percent |
| 1. Acetyl peroxy isobutyl carbonate | 43.95 | 87.9 |
| 2. Acetyl peroxy n-butyl carbonate | 44.7 | 89.4 |
| 3. Acetyl peroxy ethyl carbonate | 41.15 | 82.3 |
| 4. Acetyl peroxy 2-chloro ethyl carbonate | 16.9 | 33.8 |
| 5. Acetyl peroxy isopropyl carbonate | 35.6 | 71.2 |
| 6. Lauroyl peroxide | 6.8 | 13.6 |

Lauroyl peroxide was selected for comparison in the above test since this material is most prevalent and typical of catalysts now used for making polyvinyl chloride. All of the other initators in the table are compounds within the present invention and their advantage is dramatically shown in terms of increased yield of the desired polymer compared with the standard lauroyl peroxide.

This increased yield is obtained at a significantly increased rate. The following table lists data showing the relative conversion rates of an initiator within this invention (acetyl peroxy isobutyl carbonate) as compared with the standard lauroyl peroxide used in the polyvinyl chloride industry. The data were obtained during the execution of a vinyl chloride polymerization with a Coke bottle as described above. In this case the two initiators being compared were 0.25% by weight of the monomer.

TABLE III

[PVC conversion rate versus time—30° C.]

| Initiator | Percent weight PVC yield, time—hours | | | | | | |
|---|---|---|---|---|---|---|---|
| | 1 | 2 | 4 | 6 | 8 | 12 | 24 |
| 1. Acetyl peroxy isobutyl carbonate | 1.0 | 3.0 | 13.6 | 20.0 | 39.8 | 66.0 | 87.8 |
| 2. Lauroyl peroxide | | | | | | | 10.6 |

The unexpected superiority of the present materials as compared with analogous materials differing only by the presence of more than 7 carbon atoms in the molecule is demonstrated in this example. Here a composition provided by this invention (acetyl peroxy isobutyl carbonate) is compared with a typical higher molecular weight compound of the prior art (lauroyl poroxy isobutyl carbonate). These two initiators were used for the polymerization of vinyl chloride to produce polyvinyl chloride within a Coke bottle in the manner above described. In this case each of the initiators was added in an amount of 0.00050 mole of initiator to 50 grams of vinyl monomer. The test was executed for 6 hours at 40±20 C. The observed results are as follows:

TABLE IV

| Initiator | PVC yield, g. | Percent PVC | Yield, avg. |
|---|---|---|---|
| 1. Acetyl peroxy isobutyl carbonate: | | | |
| 1st run | 24.2 | 25.6 | 49.8 |
| 2nd run | 23.0 | 23.4 | 46.4 |
| 2. Lauroyl peroxy isobutyl carbonate: | | | |
| 1st run | 13.6 | 13.7 | 27.3 |
| 2nd run | 13.6 | 13.6 | 27.3 |

The superiority of the lower molecular weight acetyl peroxy isobutyl carbonate is most surprising when comparing the half-lives of the two initiators. The acetyl peroxy isobutyl carbonate has a longer half life, making it more stable. While this stability is highly desirable for storage and handling, such a property would normally be associated with slower reactivity. Nevertheless, as shown the more stable acetyl peroxy isobutyl carbonate is a considerably more efficient initiator. The half-life data in hours of the two initiators is summarized in the following table:

TABLE V

| Initiator | Temperature, °C. | | |
|---|---|---|---|
| | 45 | 60 | 75 |
| 1. Acetyl peroxy isobutyl carbonate | 33.0 | 3.8 | 0.56 |
| 2. Lauroyl peroxy isobutyl carbonate | 27.0 | 3.2 | 0.40 |

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In the process for making vinyl resins in aqueous suspension containing predominantely vinyl chloride the improvement comprising initiating the polymerization of said monomer with a compound of the formula:

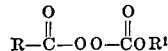

wherein R and R$^1$ are the same or different alkyl groups wherein the sum of the carbon atoms in R and R$^1$ is not more than 5.

2. The improved process in accordance with claim 1 where the monomer is all vinyl chloride.

3. A process according to claim 1 wherein R of the acyl peroxycarbonic ester is a methyl group.

4. A process according to claim 3 wherein R$^1$ of the acyl peroxycarbonic ester is an isobutyl group.

5. A process according to claim 3 wherein R$^1$ of the acyl peroxycarbonic ester is n-butyl.

6. A process according to claim 3 wherein R$^1$ of the acyl peroxycarbonic ester is ethyl.

7. A process according to claim 3 wherein R$^1$ of the acyl peroxycarbonic ester is isopropyl.

References Cited

UNITED STATES PATENTS 3,108,093   10/1963   Pajaczkowski et al. __ 260—92.8

JAMES A. SEIDLECK, Primary Examiner

J. A. DONAHUE, Jr., Assistant Examiner

U.S. Cl. X.R.

260—87.5 C, 87.5 R, 89.1, 89.5 AW, 93.5 W, 94.9 A